(12) United States Patent
Terrice

(10) Patent No.: US 8,345,403 B1
(45) Date of Patent: Jan. 1, 2013

(54) PORTABLE HVAC SOLENOID POWER KIT

(76) Inventor: John P. Terrice, Cabot, AR (US)

(*) Notice: Subject to any disclaimer, the term of this patent is extended or adjusted under 35 U.S.C. 154(b) by 346 days.

(21) Appl. No.: 12/862,226

(22) Filed: Aug. 24, 2010

(51) Int. Cl.
- *H01H 9/00* (2006.01)
- *H01H 47/00* (2006.01)
- *H01H 51/22* (2006.01)
- *H01H 51/30* (2006.01)

(52) U.S. Cl. .......................................... 361/160

(58) Field of Classification Search .......... 361/18, 361/160; 251/129.15
See application file for complete search history.

(56) References Cited

U.S. PATENT DOCUMENTS

| | | |
|---|---|---|
| 5,186,017 A | 2/1993 | Hancock et al. |
| 5,379,604 A | 1/1995 | Furr |
| 5,537,836 A | 7/1996 | Ricketts |
| 5,586,443 A | 12/1996 | Lewis |
| 5,740,005 A | 4/1998 | Chen et al. |
| 5,915,666 A | 6/1999 | Hayashi et al. |
| 6,053,198 A | 4/2000 | Atkin et al. |
| 6,805,579 B2 * | 10/2004 | Marchand et al. ............ 439/502 |
| 2009/0126798 A1 * | 5/2009 | Mather ......................... 137/12 |

* cited by examiner

*Primary Examiner* — Rexford Barnie
*Assistant Examiner* — Christopher Clark
(74) *Attorney, Agent, or Firm* — Montgomery Patent & Design LLC; Robert C. Montgomery

(57) ABSTRACT

An apparatus to aid in the removal of refrigerant from direct expansion air-conditioning systems is herein disclosed. The apparatus enables the manual activation of solenoid valves or check valves typically provided on direct expansion air-conditioning systems. A solenoid valve must be energized to allow complete access to the refrigerant in order to allow complete evacuation of the system. The apparatus is connected to a power source and a plurality of switches enables selection of 120V operation or 24V operation. The apparatus further comprises transformers, fuses, and the like to provide complete protection to the user. Final connection to the solenoid valve is made through the use of a long power lead supplied with alligator clips. The apparatus is housed in a convenient enclosure allowing for easy storage and transportation.

19 Claims, 3 Drawing Sheets

PORTABLE HVAC SOLENOID POWER KIT

RELATED APPLICATIONS

The present invention was first described in a notarized Official Record of Invention on Sep. 14, 2009, that is on file at the offices of Montgomery Patent and Design, LLC, the entire disclosures of which are incorporated herein by reference.

FIELD OF THE INVENTION

The present invention relates generally to solenoid valves, and in particular, to an attachable and portable auxiliary power supply apparatus for actuating solenoid valves for heating, ventilation, and air conditioning systems.

BACKGROUND OF THE INVENTION

The idea of air conditioning began long before any system or machine was ever created. The concept of cooling air has been utilized as far back as Ancient Rome. The discovery that certain materials could be compressed to provide evaporative cooling led to centralized air conditioning systems. These systems improved with the creation of various fluorocarbon gases; however, in recent times the environmental impact of these gases has become a concern. For example, the refrigerants used in heating, ventilation, and air conditioning (HVAC) systems pose a serious threat to the ozone and our environment. The release of these refrigerants, which once were commonplace, is now a serious offense and controlled by law. It is extremely important that all refrigerant be removed or evacuated from HVAC systems that undergo major repair or subject to replacement. Many of these systems utilize an electrically-powered solenoid valve or check valve in the refrigerant loop.

Solenoid valves for controlling various fluid flow systems are used in many industrial and residential applications. They are used to control the flow of liquids or gases in a positive, fully-closed or fully-open mode. The solenoid valve is operated by opening and closing an orifice in a valve body that permits or prevents fluid flow. The orifice is opened or closed using a plunger that is raised or lowered within a sleeve tube by energizing a coil. In many systems the valve is normally closed, such that when the coil is energized, a magnetic field is produced, raising the plunger and allowing flow through the valve. Solenoid valves are also classified into two groups, those powered by an alternating current (AC) power source and those powered by a direct current (DC) power source.

Whether AC or DC powered, the solenoid is typically energized by the same power source which provides power to the overall system. In HVAC systems, under normal conditions without power applied, these valves are closed, thus isolating some of the refrigerant within the refrigerant loop. It is extremely difficult to access such refrigerant due to the lack of power which is not supplied to the unit during repair, replacement, or disposal.

Accordingly, there exists a need for a means by which solenoid valves in direct expansion air conditioning systems can be manually activated in a bypass manner to allow for complete removal of enclosed refrigerant. The development of the present invention substantially departs from the conventional solutions and in doing so fulfills this need.

SUMMARY OF THE INVENTION

In view of the foregoing references, the inventor recognized the aforementioned inherent problems and lack in the art and observed that there exists a need for tool for manually energizing solenoid valves, particularly those used on direct expansion air conditioning systems. Thus, the object of the present invention is to solve the aforementioned disadvantages and provide for this need.

Another object of the present invention is to provide an apparatus which can be used on both AC powered solenoid valves and DC powered solenoid valves.

Yet another object of the present invention is to provide an apparatus which simply connects to the electrical terminals of the solenoid valves.

Yet another object of the present invention is to provide an apparatus which can be used on air conditioning systems undergoing repair, replacement, or disposal to reclaim refrigerant and eliminate accidental release into the environment.

Yet still another object of the present invention is to provide an apparatus in which all functional components are conveniently housed together and easily transported to a desired work area.

Yet still another object of the present invention is to provide an apparatus which is simple and intuitive to use with little to no training.

Yet still another object of the present invention is to provide an apparatus which is durable and economical to manufacture.

One (1) or more of these and other objects of the invention are achieved by providing an auxiliary power supply apparatus for solenoid valves comprising a power cord for providing an input voltage, a first primary overcurrent protector for of circuit protection, and a power switch including an on position for distributing the input voltage and an off position for restricting the input voltage. A voltage selector switch is included for manually selecting between a first operating voltage and a second operating voltage. A second primary overcurrent protector for providing a secondary means of circuit protection, a step down transformer for transforming the input voltage to the second operating voltage, and a secondary overcurrent protector for providing a tertiary means of circuit protection are also included. A first operating voltage cable having a pair of first operating voltage terminations enables electrical connection of the first operating voltage to at least one (1) solenoid valve having a first operating voltage and a second operating voltage cable having a pair of second operating voltage terminations enables electrical connection of the second operating voltage to at least one (1) solenoid valve having a second operating voltage. An electrically insulative enclosure comprising a five-sided body, a hingedly attached lid, and a plurality of storage compartments provides a convenient storage housing for the functioning electrical components.

Furthermore, the described features and advantages of the invention may be combined in various manners and embodiments as one skilled in the relevant art will recognize. The invention can be practiced without one (1) or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
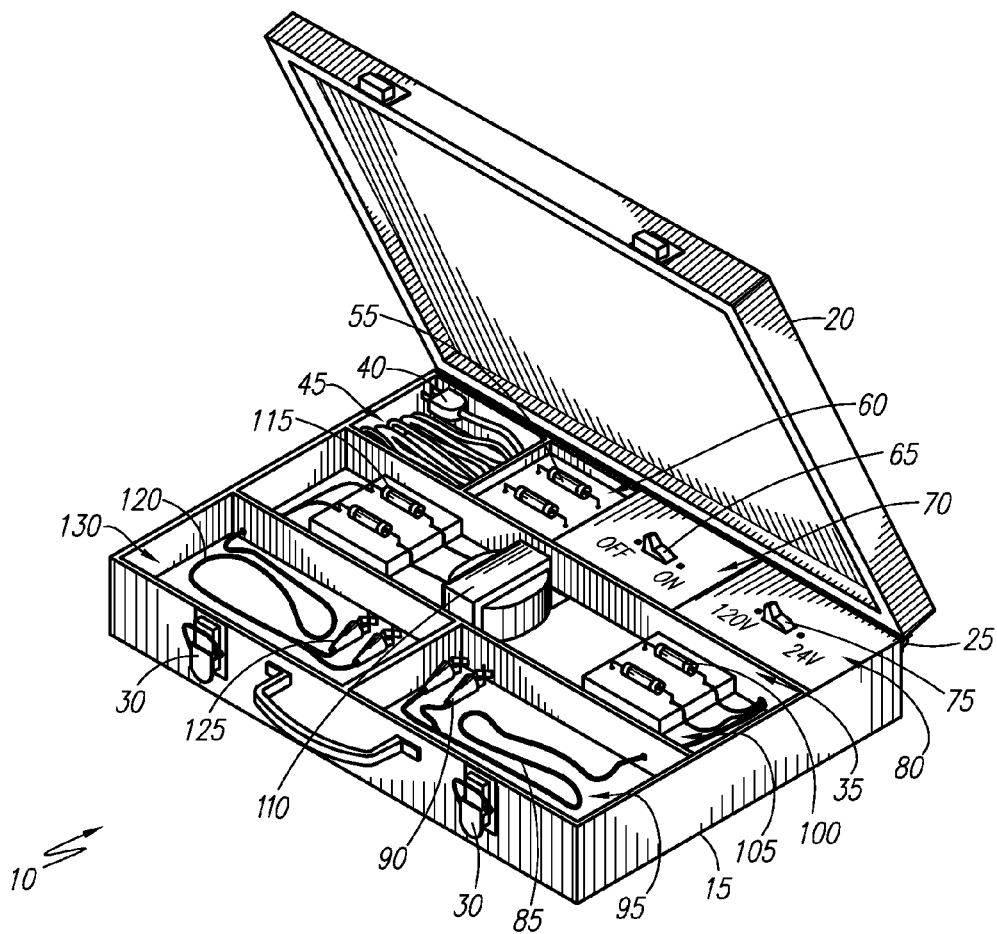
FIG. 1 is a front view of the auxiliary power supply for solenoid valve 10, depicted in an open state, according to the preferred embodiment of the present invention.

DESCRIPTIVE KEY 10 auxiliary power supply for solenoid valve
15 carrying enclosure
20 flat opening lid
25 hinge
30 clasp
35 array of storage compartments
40 incoming power cord
45 first storage compartment
50 electrical power outlet
55 first primary overcurrent protective device
60 first access compartment
65 power switch
70 first control compartment
75 voltage selector switch
80 second control compartment
85 line voltage power feed cable
90 line voltage temporary termination
95 second storage compartment
100 second primary overcurrent device
105 second access compartment
110 step down transformer
115 secondary overcurrent device
120 reduced voltage power feed cable
125 reduced voltage temporary termination
130 third storage compartment
135 refrigerant-equipped device
140 solenoid valve
145 contained piping
150 contained equipment

DETAILED DESCRIPTION OF THE PREFERRED EMBODIMENT

Figure 2:
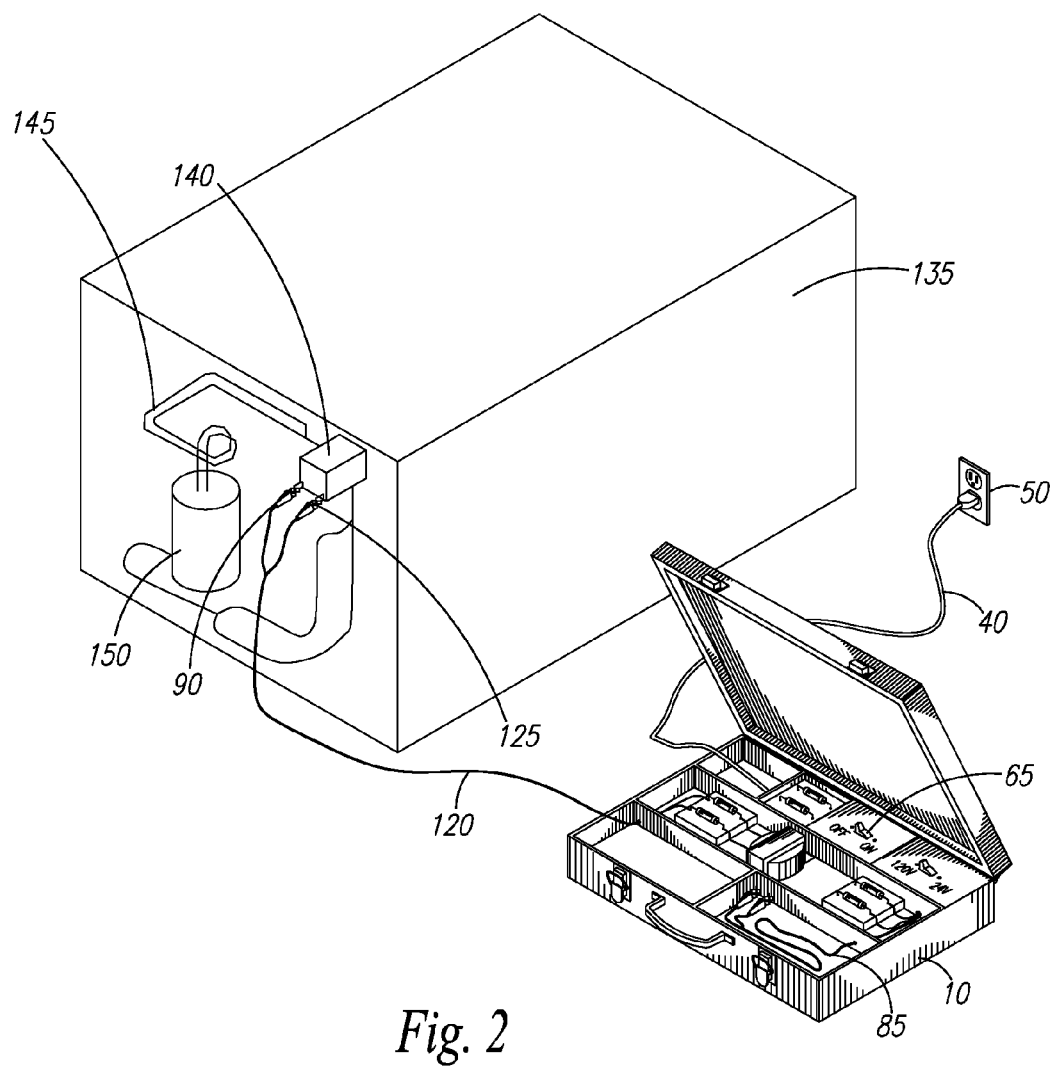
FIG. 2 is a pictorial view of the auxiliary power supply for solenoid valve 10 depicted in a utilized state, according to the preferred embodiment of the present invention; and, FIG. 3 is an electrical schematic diagram depicting the major electrical components of the auxiliary power supply for solenoid valve 10, according to the preferred embodiment of the present invention.
Figure 3:
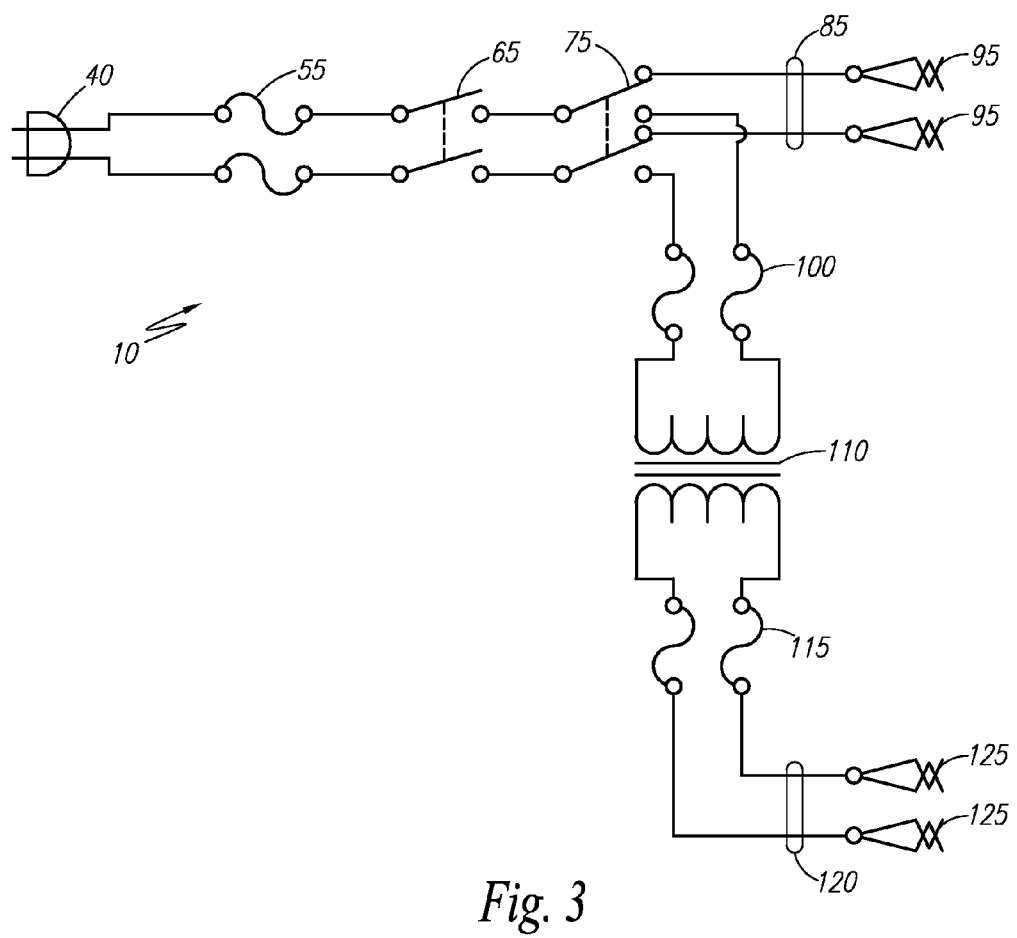

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an auxiliary power supply for solenoid valve (herein described as the "apparatus") 10, which provides a means to assist in the removal of refrigerant from direct expansion air-conditioning system by enabling manual activation of solenoid valves or check valves typically provided on direct expansion air-conditioning systems.

Referring now to FIG. 1, a front view of the apparatus 10, shown in an open state, according to the preferred embodiment of the present invention, is disclosed. The apparatus 10 is provided in a low-profile carrying enclosure 15. A flat opening lid 20 complete with hinges 25 and clasps 30 opens to expose an array of storage compartments 35 which houses various electrical components and sub-assemblies. The features of the carrying enclosure 15 allow it to be conveniently transported to a work location where it can be opened, deployed, and simply utilized. The enclosure 15 also enabled the apparatus 10 to be stored in a small case when not in use. It is envisioned that the carrying enclosure 15 would preferably be fabricated from a durable plastic material having electrically insulating characteristics, thereby being free of shock hazards.

The array of storage compartments 35 provides the ability to safety store various electrical components which are deployed, activated, controlled, or accessed during use of the apparatus 10. An incoming power cord 40 is housed in a first storage compartment 45. The incoming power cord 40 is connected to an electrical power outlet 50 during utilization of the apparatus 10. It is envisioned that the electrical power outlet 50 would be of a NEMA 5-15R configuration capable of providing 120 VAC at sixty Hertz (60 Hz), although other configurations and voltages could easily be accommodated as well, and as such, should not be interpreted as a limiting factor of the present apparatus 10. The incoming power cord 40 supplies a pair of first primary overcurrent protective devices 55 in a first access compartment 60. The pair of first primary overcurrent protective devices 55 comprising such components as fuses or thermal breakers which provide overload and short-circuit protection of the apparatus 10.

A power switch 65 is located in a first control compartment 70 and provides for electrical actuation of the apparatus 10. Opening the power switch 65 or placing it in an "OFF" position restricts power from the remainder of the electrical components, which are described herein below. Closing the power switch 65 or placing it in an "ON" position supplies power to the balance of the electrical components. It is envisioned that the power switch 65 preferably comprises a double-pole, single throw variety to ensure safety in the event of operation of a miss-wired electrical power outlet 50.

Power is routed to a voltage selector switch 75 located in a second control compartment 80. The voltage selector switch 75 is used to select one of two operating voltages for the apparatus 10. In a first position, the voltage selector switch 75 permits operation of the apparatus 10 at line voltage, or at 120 VAC. In the first position, the voltage selector switch 75 supplies power to a line voltage power feed cable 85 and a pair of line voltage temporary terminations 90 located in a second storage compartment 95. The line voltage temporary terminations 90 are envisioned to preferably be "alligator clips" or similar clamping assemblies capable of providing a secure but temporary electrical connection. In the second position, the voltage selector switch 75 supplies power to a second primary overcurrent device 100 located in a second access compartment 105. The second primary overcurrent device 100 provides overcurrent protection to a step down transformer 110 also located in the second access compartment 105. An output of the step down transformer 110 is routed through a set of secondary overcurrent devices 115 also located in the second access compartment 105. The output of the secondary overcurrent device 115 is directs through a reduced voltage power feed cable 120 to a pair of reduced voltage temporary terminations 125 stored in a third storage compartment 130. The reduced voltage temporary terminations 125 are envisioned to preferably be "alligator clips" or similar clamping assemblies for providing a secure but temporary electrical connection. Both the second primary overcurrent device 100 and the secondary overcurrent device 115 provide overcurrent and short circuit protection for the step down transformer 110 as well as for the connected electrical loads.

Referring next to FIG. 2, a pictorial view of the apparatus 10, shown in a utilized state, according to the preferred embodiment of the present invention, is disclosed. The apparatus 10 is placed nearby a refrigerant equipped device 135 such as an air conditioning unit, chiller, refrigeration system or the like. The incoming power cord 40 is connected to a nearby electrical power outlet 50. Either the line voltage power feed cable 85 or the reduced voltage power feed cable 120 is electrically connected to a solenoid valve 140 using the line voltage temporary terminations 90 or the reduced voltage temporary terminations 125, respectively. Such connection is utilized only after all conventional operating power has been removed from the refrigerant equipped device 135 and secured in a locked state. At the appropriate time in the purging process, the power switch 65 on the apparatus 10 is activated to open the solenoid valve 140 which enables total emptying or purging of all refrigerant from within contained piping 145 and contained equipment 150. The configuration of the apparatus 10 as depicted in FIG. 2 would be present immediately before, during, and immediately after the refrigerant reclaiming and purging process.

Referring finally, to FIG. 3, an electrical schematic diagram depicting the major electrical components of the apparatus 10, according to the preferred embodiment of the present invention, is disclosed. Electrical power is routed to the apparatus 10 via the incoming power cord 40. Current then flows through the first primary overcurrent protective device 55 arranged in a parallel configuration in both the hot and neutral lines. The power is controlled via the power switch 65 which in effect turns the apparatus 10 on and off and likewise results in the opening and closing of the solenoid valve 140, as shown in FIG. 2. The controlled power is applied to the voltage selector switch 75 which directs current flow in one (1) of two (2) ways. In the first position, current is sent directly to the line voltage temporary terminations 90 via the line voltage power feed cable 85. In this position, the first primary overcurrent protective device 55 provides for overcurrent and short circuit protection. In the second position, the current is sent through the second primary overcurrent devices 100, the step down transformer 110, and then the secondary overcurrent device 115 to the reduced voltage temporary terminations 125 via the reduced voltage power feed cable 120. The second position is intended for solenoid valves 140 which operate at a lower voltage, such as 24 VAC. Utilization of the apparatus 10 enables temporarily actuation of both line (high) voltage and control (low) voltage solenoid valves 140.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the apparatus 10 would be constructed in general accordance with FIG. 1 through FIG. 3. After procurement and general familiarization with the apparatus 10 it would be transported to the worksite for utilization.

During utilization while removing or purging all refrigerant from a refrigerant equipped device 135, the user would first verify that all sources of external voltage have not only been removed, but disconnected and secured or "locked-out" in an OFF state. Next, the user would gain access to the solenoid valve 140 by removing any necessary access panels or covers. Any permanently attached wiring to the solenoid valve 140 would be removed. The user would next verify the proper voltage that is utilized by the solenoid valve 140 and set the voltage selector switch 75 to the proper voltage. The user would then take the appropriate line voltage power feed cable 85 or reduced voltage power feed cable 120 and attach it via the line voltage temporary terminations 90 or the reduced voltage temporary terminations 125 as required. Finally, after once again verifying the voltage selector switch 75 is set to the proper voltage level and the power switch 65 is in the OFF position, the user would plug the incoming power cord 40 from the apparatus 10 into a suitable energized electrical power outlet 50. At this point in time, the apparatus 10 is ready for operation.

During actual use of the apparatus 10, the power switch 65 would simply be activated in the ON position. This will in effect result in the energizing of the attached solenoid valve 140, thus allowing access to all contained refrigerant. After the reclamation and/or purging process is complete, the power switch 65 will be turned off, the connection process as described above reversed. The connection cords consisting of the incoming power cord 40, the line voltage power feed cable 85 and the reduced voltage power feed cable 120 are coiled back up and placed within the first storage compartment 45, the second storage compartment 95 and the reduced voltage power feed cable 120 respectively. The flat opening lid 20 would then be closed and the apparatus 10 stored away until needed again in a cyclical and repeating manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An auxiliary power supply apparatus for solenoid valves, said apparatus comprising:
   a power cord for providing an input voltage;
   a first primary overcurrent protector in electrical communication with said power cord for providing a means of circuit protection;
   a power switch in electrical communication with said first primary overcurrent protector for manually switching said input voltage on and off;
   a voltage selector switch in electrical communication with said power switch for manually selecting between a first operating voltage and a second operating voltage;
   a means to transform said input voltage to said second operating voltage;
   a first connection means to electrically connect said first operating voltage to at least one solenoid valve having a first operating voltage;
   a second connection means to electrically connect said second operating voltage to at least one solenoid valve having a second operating voltage; and, an enclosure comprising a five-sided body and a hingedly attached lid.

2. The apparatus of claim 1, wherein said means to transform further comprises:
- a second primary overcurrent protector in electrical communication with said voltage selector switch for providing a secondary means of circuit protection;
- a step down transformer in electrical communication with said pair of second primary overcurrent protectors; and,
- a secondary overcurrent protector in electrical communication with said step down transformer for providing a tertiary means of circuit protection.

3. The apparatus of claim 2, wherein said first primary overcurrent protector, said second primary overcurrent protector, and said secondary overcurrent protector each further comprises at least one fuse.

4. The apparatus of claim 2, wherein said first primary overcurrent protector, said second primary overcurrent protector, and said secondary overcurrent protector each further comprises at least one magnetic circuit breaker.

5. The apparatus of claim 1, wherein said enclosure further comprises:
- a plurality of storage compartments disposed within said five-sided body;
- at least one hinge affixed to opposing rear edges of said five-sided body and said lid for providing a hinged attachment means;
- at least two clasps affixed to opposing front edges of said five-sided body and said lid for providing a retaining means; and,
- a carrying handle affixed to at least one side of said five-sided body.

6. The apparatus of claim 1, wherein said first connection means further comprises a first operating voltage cable and a pair a first operating voltage clamp-type electrical connectors for releasably connecting an electrical terminal to said first operating voltage cable.

7. The apparatus of claim 1, wherein said second connection means further comprises a second operating voltage cable and a pair of second operating voltage clamp-type electrical connectors for releasably connecting an electrical terminal to said second operating voltage cable.

8. The apparatus of claim 1, wherein said power switch further comprises an on position for distributing said input voltage and an off position for restricting said input voltage.

9. The apparatus of claim 1, wherein said first operating voltage is equivalent to said input voltage and said second operating voltage is less than said input voltage.

10. An auxiliary power supply apparatus for solenoid valves, said apparatus comprising:
- a power cord for providing an input voltage;
- a first primary overcurrent protector in electrical communication with said power cord for providing a means of circuit protection;
- a power switch in electrical communication with said first primary overcurrent protector, said switch further comprising an on position for distributing said input voltage and an off position for restricting said input voltage;
- a voltage selector switch in electrical communication with said power switch for manually selecting between a first operating voltage and a second operating voltage;
- a second primary overcurrent protector in electrical communication with said voltage selector switch for providing a secondary means of circuit protection;
- a step down transformer in electrical communication with said second primary overcurrent protector for transforming said input voltage to said second operating voltage;
- a secondary overcurrent protector in electrical communication with said step down transformer for providing a tertiary means of circuit protection;
- a first operating voltage cable having a pair of first operating voltage terminations to electrically connect said first operating voltage to at least one solenoid valve having a first operating voltage;
- a second operating voltage cable having a pair of second operating voltage terminations to electrically connect said second operating voltage to at least one solenoid valve having a second operating voltage; and,
- an electrically insulative enclosure comprising a five-sided body and a hingedly attached lid.

11. The apparatus of claim 10, wherein said first operating voltage is equivalent to said input voltage and said second operating voltage is less than said input voltage.

12. The apparatus of claim 11, wherein said pair of first operating voltage terminations each further comprises a clamp-type electrical connector for releasably connecting an electrical terminal to said first operating voltage cable; and,
wherein said pair of second operating voltage terminations each further comprises a clamp-type electrical connector for releasably connecting an electrical terminal to said second operating voltage cable.

13. The apparatus of claim 12, wherein said enclosure further comprises:
- at least one hinge affixed to opposing rear edges of said five-sided body and said lid for providing a hinged attachment means;
- at least two clasps affixed to opposing front edges of said five-sided body and said lid for providing a retaining means; and,
- a carrying handle affixed to at least one side of said five-sided body.

14. The apparatus of claim 13, wherein said first operating voltage is equivalent to 120 VAC and said second operating voltage is 24 VAC; and,
wherein said first primary overcurrent protectors, said second primary overcurrent protectors, and said secondary overcurrent protectors each further comprises at least one fuse.

15. The apparatus of claim 13, wherein said first operating voltage is equivalent to 120 VAC and said second operating voltage is 24 VAC; and,
wherein said first primary overcurrent protectors, said second primary overcurrent protectors, and said secondary overcurrent protectors each further comprises at least one thermal-magnetic circuit breaker.

16. The apparatus of claim 13, wherein said enclosure further comprises:
- a first storage compartment for housing said power cord;
- a first access compartment for housing said first primary overcurrent protector;
- a first control compartment for housing said power switch;
- a second control compartment for housing said voltage selector switch;
- a second storage compartment for housing said first operating voltage cable having a pair of first operating voltage terminations;
- a second access compartment for housing said second primary overcurrent protector, said step down transformer, and said secondary overcurrent protector; and, a third storage compartment for housing said second operating voltage cable having a pair of second operating voltage terminations.

17. The apparatus of claim 16, wherein said first operating voltage is equivalent to 120 VAC and said second operating voltage is 24 VAC; and,
wherein said first primary overcurrent protectors, said second primary overcurrent protectors, and said secondary overcurrent protectors each further comprises at least one fuse.

18. The apparatus of claim 16, wherein said first operating voltage is equivalent to 120 VAC and said second operating voltage is 24 VAC; and,
wherein said first primary overcurrent protectors, said second primary overcurrent protectors, and said secondary overcurrent protectors each further comprises at least one thermal-magnetic circuit breaker.

19. A method of manually supplying power to a solenoid valve during removal of refrigerant from a direct expansion cooling system, said method comprising the steps of:
providing an auxiliary power supply apparatus comprising a power cord for providing an input voltage, a first primary overcurrent protector in electrical communication with said power cord for providing a means of circuit protection, a power switch in electrical communication with said first primary overcurrent protector, said switch further comprising an on position for distributing said input voltage and an off position for restricting said input voltage, a voltage selector switch in electrical communication with said power switch for manually selecting between a first operating voltage and a second operating voltage, a second primary overcurrent protector in electrical communication with said voltage selector switch for providing a secondary means of circuit protection, a step down transformer in electrical communication with said second primary overcurrent protector for transforming said input voltage to said second operating voltage, a secondary overcurrent protector in electrical communication with said step down transformer for providing a tertiary means of circuit protection, a first operating voltage cable having a pair of first operating voltage terminations to electrically connect said first operating voltage to at least one solenoid valve having a first operating voltage, a second operating voltage cable having a pair of second operating voltage terminations to electrically connect said second operating voltage to at least one solenoid valve having a second operating voltage, and an electrically insulative enclosure comprising a five-sided body and a hingedly attached lid;
disconnecting electrical power from a direct expansion cooling system comprising at least a compressor, a coil, an amount of pressurized refrigerant, and at least one solenoid valve;
determining an operating voltage of said at least one solenoid valve;
removably connecting said a pair of first operating voltage terminations to electrical terminals of said at least one solenoid valve having a first operating voltage;
removably connecting said a pair of second operating voltage terminations to electrical terminals of said at least one solenoid valve having a second operating voltage;
positioning said voltage selector switch to correspond to either said first operating voltage or said second operating voltage;
switching said power switch to an on position thereby energizing said at least one solenoid valve; and,
collecting said amount of pressurized refrigerant released through said at least one solenoid valve.

\* \* \* \* \*